US006796543B2

(12) United States Patent
Haeberer et al.

(10) Patent No.: US 6,796,543 B2
(45) Date of Patent: Sep. 28, 2004

(54) ELECTROMAGNETIC VALVE FOR CONTROLLING A FUEL INJECTION OF AN INTERNAL COMBUSTION ENGINE

(75) Inventors: Rainer Haeberer, Bretten (DE); Hermann Koch-Grober, Stuttgart (DE); Holger Rapp, Hemmingen (DE); Christoffer Uhr, Bruchsal (DE); Andreas Rettich, Herrenberg (DE); Wolfgang Fleiner, Stuttgart (DE); Markus Rueckle, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 136 days.

(21) Appl. No.: 10/181,879

(22) PCT Filed: Nov. 16, 2001

(86) PCT No.: PCT/DE01/04318

§ 371 (c)(1),
(2), (4) Date: Nov. 4, 2002

(87) PCT Pub. No.: WO02/42632

PCT Pub. Date: May 30, 2002

(65) Prior Publication Data

US 2004/0026540 A1 Feb. 12, 2004

(30) Foreign Application Priority Data

Nov. 23, 2000 (DE) .......................................... 100 58 007
Mar. 17, 2001 (DE) .......................................... 101 13 008

(51) Int. Cl.$^{7}$ ................................................ F16K 31/02

(52) U.S. Cl. ............... 251/50; 251/129.16; 251/129.19; 239/585.3

(58) Field of Search ........................ 251/50, 48, 129.16, 251/129.19; 239/585.3, 585.1

(56) References Cited

U.S. PATENT DOCUMENTS 4,957,275 A * 9/1990 Homes ........................ 251/50
5,560,549 A * 10/1996 Ricco et al. ........... 251/129.16
6,062,531 A 5/2000 Rapp et al.
6,131,829 A * 10/2000 Ricco .................... 251/129.16
6,161,813 A * 12/2000 Baumgartner et al. ........ 251/50

FOREIGN PATENT DOCUMENTS

| | | |
|---|---|---|
| DE | 197 08 104 | 9/1998 |
| DE | 197 51 240 | 5/1999 |
| EP | 0 604 913 | 7/1994 |
| EP | 0 890 731 | 1/1999 |
| EP | 0 915 255 | 5/1999 |

* cited by examiner

*Primary Examiner*—John Bastianelli
(74) *Attorney, Agent, or Firm*—Kenyon & Kenyon

(57) ABSTRACT

A solenoid valve for controlling a fuel injector of an internal combustion engine, including an electromagnet, a movable armature featuring an armature plate and an armature pin, as well as a control valve member, which is moved with the armature and cooperates with a valve seat, for opening and closing a fuel discharge passage of a control pressure chamber of the fuel injector, the armature plate being supported on the armature pin, so that it is slidably movable in the closing direction of the control valve member under the action of its inertial mass, against the elastic force of a return spring that acts upon the armature plate; and including a hydraulic damping device which permits damping of a post-oscillation of the armature plate during its dynamic sliding on the armature pin. To facilitate the assembly and reduce a disadvantageous post-oscillation process of the armature plate, it is proposed for the return spring to be braced, with its end facing away from the armature plate, against a supporting piece, which is mounted on and moved with the armature pin and which, at the same time, constitutes a part of the damping device.

10 Claims, 4 Drawing Sheets

ELECTROMAGNETIC VALVE FOR CONTROLLING A FUEL INJECTION OF AN INTERNAL COMBUSTION ENGINE

FIELD OF THE INVENTION

The present invention relates to a solenoid valve for controlling a fuel injector of an internal combustion engine.

BACKGROUND INFORMATION

A solenoid valve is described, for example, in German Patent Application No. 197 08 104. The solenoid valve may be used, for example, to control the fuel pressure in the control pressure chamber of a fuel injector, for example, an injector of a common-rail injection system. The fuel pressure in the control pressure chamber controls the movement of a valve plunger, which is used to open or close an injection orifice of the fuel injector. The solenoid valve includes an electromagnet arranged in a housing part, a movable armature, and a control valve member, which is moved with the armature. A closing spring acts upon the control valve member in the closing direction and the control valve member cooperates with a valve seat of the solenoid valve, thus controlling the fuel discharge from the control pressure chamber. It is believed that these solenoid valves are disadvantageous in that they exhibit armature bounce. When the magnet is de-energized, the closing spring of the solenoid valve accelerates the armature and the control valve member toward the valve seat to close a fuel discharge passage from the control pressure chamber. The impact of the control valve member on the valve seat may cause the control valve member to oscillate and/or bounce at the valve seat in a disadvantageous manner, thereby impairing the control of the injection process.

In the solenoid valve described, for example, in German Patent Application No. 197 08 104, the armature has a two-part design, which includes an armature pin and an armature plate slidably supported on the armature pin, so that the armature plate continues to move against the elastic force of a return spring when the valve control member hits the valve seat. Subsequently, the return spring restores the armature plate to its original position at a stop of the armature pin. Due to the two-part armature, the effective mass to be decelerated and, consequently, the bounce-causing kinetic energy of the armature striking the valve seat, may be reduced. However, the armature plate may disadvantageously oscillate on the armature pin after the closure of the solenoid valve. Since a defined injection quantity may be produced again by controlling the solenoid valve only after the armature plate has stopped oscillating, the post-oscillation of the armature plate should be reduced, for example, to obtain short intervals between, for example, a preinjection and a main injection.

To solve this problem, German Patent Application No. 197 08 104 describes an overtravel stop that limits the path length by which the armature plate may slide on the armature pin. The overtravel stop is immovably mounted in the housing of the solenoid valve between the armature plate and a slide piece, which guides the armature pin. When the armature plate approaches the overtravel stop, a hydraulic damping chamber is formed between the facing sides of the armature plate and the overtravel stop. The fuel contained in the damping chamber produces a force that counteracts the movement of the armature plate. In this manner, the post oscillation of the armature plate may be damped and the post-oscillation time of the armature plate may be shortened.

However, it is believed that the required overtravel distance of the armature plate must be adjusted in the housing of the solenoid valve during the assembly of the solenoid valve. This may require a costly modification of the manufacturing process if the manufacturing facilities have to be retrofitted accordingly.

SUMMARY

It is believed that an exemplary solenoid valve according to the present invention is advantageous in that the armature, including the armature plate, armature pin, return spring, and the overtravel stop, may be preassembled outside of the assembly line of the fuel injector, and the required sliding path of the armature plate on the armature pin may be adjusted outside of the housing of the fuel injector. Subsequently, the preassembled armature assembly may be fitted into the housing of the solenoid valve. No costly modification of the assembly line may be required. Moreover, since the return spring, which presses the armature plate against a first stop on the armature pin with a first end in its resting position, is not immovably supported with the second end in the housing of the solenoid valve, but rather is braced against a supporting piece, which is secured to and moved with the armature pin, the return spring does not counteract the closing spring of the solenoid valve acting upon the armature pin. Therefore, the closing spring of the solenoid valve may have a lower spring tension force. Since the return spring does not counteract the closing spring, the return spring does not influence the dynamic performance of the armature pin.

The armature pin may be slidably supported in an opening of a slide piece, which is immovably mounted in the housing of the solenoid valve, and for the slide piece side facing the armature plate to include a recess, in which the supporting piece is located. The supporting piece is secured to the armature pin, the outer contour of the supporting piece being spaced apart from the inner contour of the recess by a gap. In this manner, a hydraulic damping chamber may be formed through the approximation of the supporting piece to the inner wall of the recess of the slide piece and the fuel, which is compressed between the supporting piece and the recess, may damp the impact of the control valve member coupled to the armature pin.

DETAILED DESCRIPTION

Figure 1:
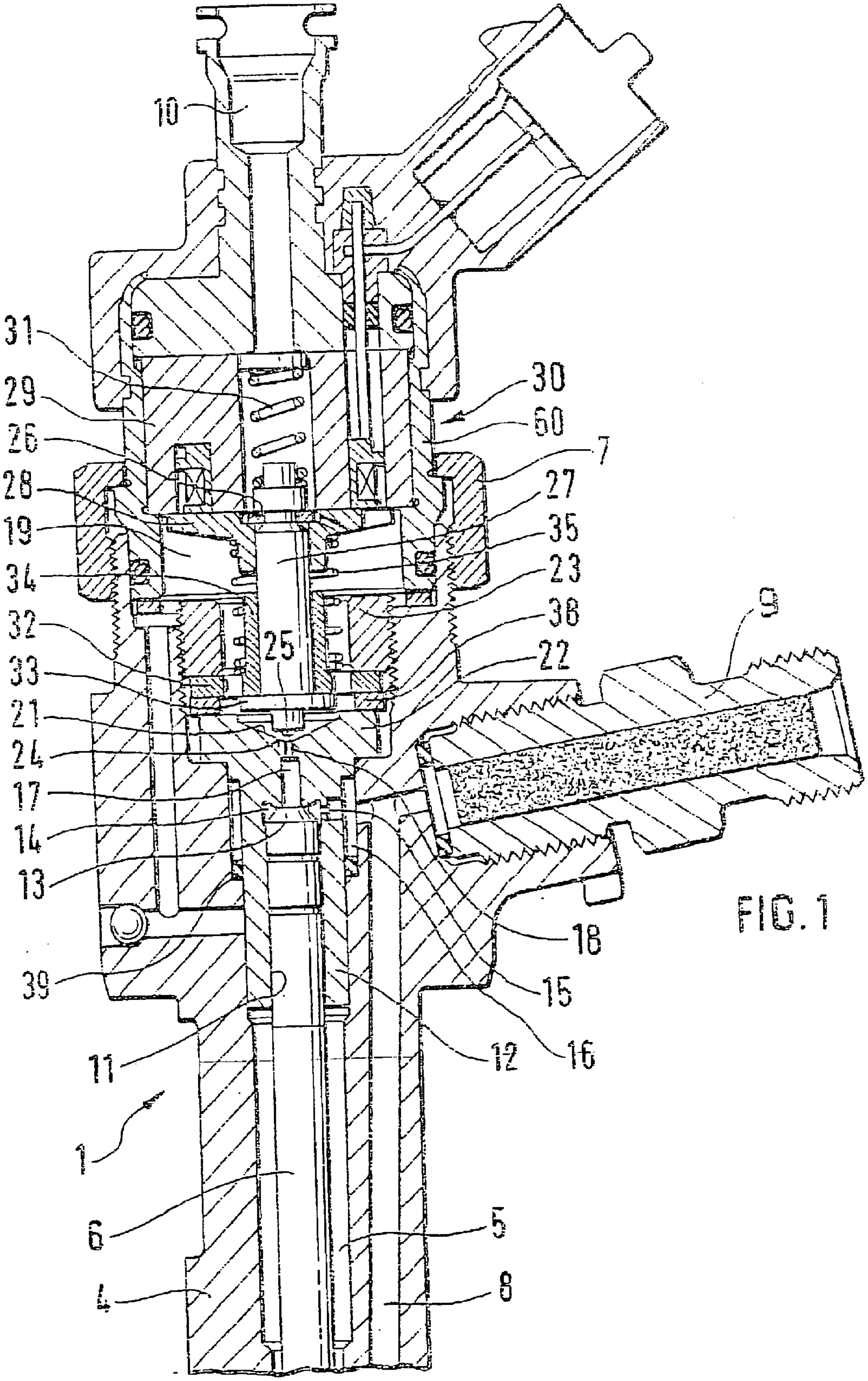
FIG. 1 is a cross-sectional view of an upper portion of a fuel injector, including a solenoid valve.

FIG. 1 shows the upper portion of a conventional fuel injector 1, which may be used, for example, in a fuel-injection system equipped with a high-pressure fuel accumulator continuously supplied with high-pressure fuel via a high-pressure feed pump. Fuel injector 1 has a valve housing 4 with a longitudinal bore 5, in which a valve plunger 6 is located. Via one of its ends, the valve plunger 6 acts upon a valve needle disposed in a nozzle body (not shown). The valve needle is arranged in a pressure chamber, which is supplied with fuel at high pressure via a pressure bore 8. During an opening stroke of valve plunger 6, the valve needle is lifted against the closing force of a spring by the high fuel pressure in the pressure chamber, which continuously acts upon a pressure shoulder of the valve needle. The fuel is injected into the combustion chamber of the internal combustion engine via an injection orifice, which is connected to the pressure chamber. By lowering valve plunger 6, the valve needle is pressed into the valve seat of the fuel injector in the closing direction, completing the injection process.

As shown in FIG. 1, valve plunger 6 is guided in a cylinder bore 11 at its end facing away from the valve needle, the cylinder bore being provided in a valve piece 12 inserted in valve housing 4. End face 13 of valve plunger 6 encloses a control pressure chamber 14 in cylinder bore 11, control pressure chamber 14 being connected to a high-pressure fuel connection via an inlet passage. The inlet passage includes three parts. One part, a bore, extends radially through the wall of valve piece 12 and has inside walls that form an inlet throttle 15 over a part of their length. The bore is permanently connected to an annular space 16 via a fuel filter, which is inserted in the inlet passage. The annular space 16 surrounds the valve piece on the peripheral side and is permanently connected to the high-pressure fuel connection of a connection piece 9, which may be screwed into valve housing 4. A sealing ring 39 seals annular space 16 from longitudinal bore 5. Control pressure chamber 14 is subjected to the high fuel pressure present in the high-pressure fuel accumulator via inlet throttle 15. A bore branches off from control pressure chamber 14 coaxially to valve plunger 6, the bore extending in valve piece 12 and forming a fuel discharge passage 17, which includes a discharge throttle 18. The discharge passage 17 empties into a relief chamber 19, which is connected to a low-pressure fuel connection 10. Low-pressure fuel connection 10 is connected to the fuel return of fuel injector 1 (in a manner not shown). The outlet of fuel discharge passage 17 from valve piece 12 occurs in the region of a conically countersunk part 21 of the external end face of valve piece 12. Valve piece 12 is firmly clamped to valve housing 4 in a flange region 22 via a threaded member 23.

A valve seat 24 is formed in conical part 21. The valve seat 24 cooperates with a control valve member 25 of a solenoid valve 30 controlling the fuel injector. The control valve member 25 is coupled to a two-part armature having an armature pin 27 and an armature plate 28, the armature cooperating with an electromagnet 29 of the solenoid valve 30. Solenoid valve. 30 further includes a housing part 60 accommodating the electromagnet and firmly connected to valve housing 4 via threaded connecting arrangement 7. In a conventional solenoid valve, armature plate 28 is supported on armature pin 27, so that it is dynamically movable under the action of its inertial mass against a preload force of a return spring 35 and, in the resting condition, is pressed by the return spring against a crescent disk 26, which is secured to armature pin 27. With its other end, return spring 35 is braced, immovably relative to the housing, against a flange 32 of a slide piece 34, which guides armature pin 27. Return spring 35 is firmly clamped in the valve housing with the flange between a spacer disk 38 placed on valve piece 12 and threaded member 23. Armature pin 27, armature disk 28, and control valve member 25, which is coupled to the armature pin, are permanently acted upon by a closing spring 31, which is immovably supported relative to the housing, so that control valve member 25 normally bears against valve seat 24 in the closed position. When the electromagnet is energized, armature plate 28 is attracted by the electromagnet and discharge passage 17 is opened toward relief chamber 19. Between control valve member 25 and armature plate 28, an annular shoulder 33 is located on armature pin 27, the annular shoulder striking against flange 32 when the electromagnet is energized, thus limiting the opening stroke of control valve member 25. Spacer disk 38 adjusts the opening stroke. The spacer disk 38 is located between flange 32 and valve piece 12. In other solenoid valves, the opening stroke of control valve member 25 may be adjusted, for example, via a stop element located between armature plate 28 and electromagnet 29.

The opening and the closure of the fuel injector is controlled by solenoid valve 30 as described below. Armature pin 27 is loaded by closing spring 31 in the closing direction, so that, when the electromagnet is de-energized, control valve member 25 engages on valve seat 24 and control pressure chamber 14 is closed toward relief side 19. In this manner, the high pressure, which is also present in the high-pressure fuel accumulator, builds up rapidly. The pressure in control pressure chamber 14 produces a closing force on valve plunger 6 and, consequently, on the valve needle connected thereto via the surface of end face 13. This force is greater than the forces acting in the opening direction caused by the prevailing high pressure. When control pressure chamber 14 is opened toward relief side 19 by the opening of the solenoid valve, the pressure in the small volume of control pressure chamber 14 is reduced quickly, since the control pressure chamber is decoupled from the high pressure side via inlet throttle 15. Thus, the force from the high fuel pressure present at the valve needle acting upon the valve needle in the opening direction predominates, so that the valve needle is moved upward and the at least one injection orifice is opened for injection. However, when solenoid valve 30 closes fuel discharge passage 17, the pressure in control pressure chamber 14 may be built up again by the subsequent flow of fuel, so that the original closing force is present, closing the valve needle of the fuel injector.

Figure 2:
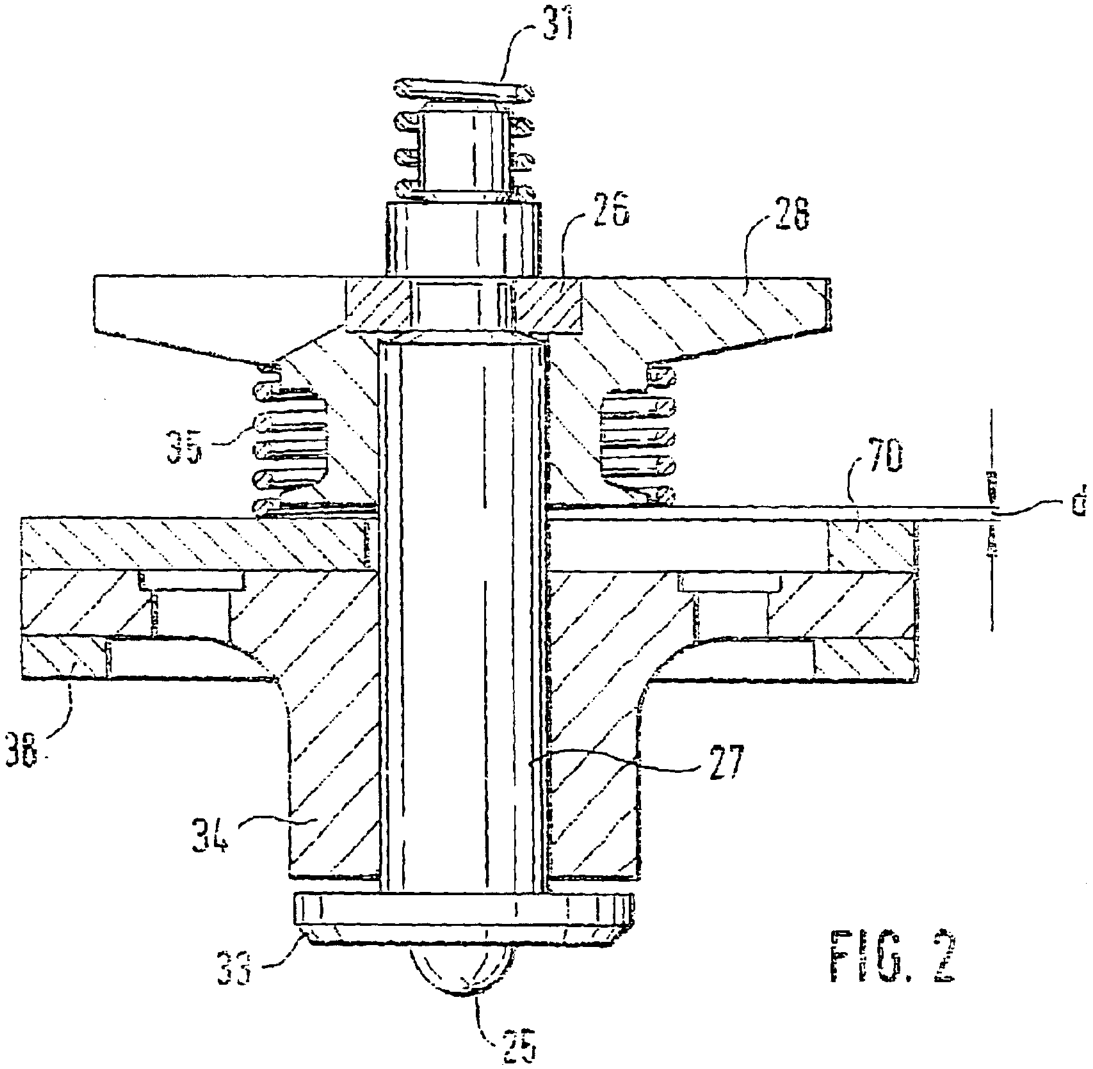
FIG. 2 is a cross-sectional view of the solenoid valve shown in FIG. 1, including an overtravel adjusting disk.

During the closure of the solenoid valve, closing spring 31 presses armature pin 27, together with control valve member 25, abruptly against valve seat 24. A disadvantageous bounce or post-oscillation of the control valve member may occur because the impact of the armature pin on the valve seat may cause an elastic deformation thereof, which acts as an energy store, part of the energy being transferred to the control valve member again, which then bounces from valve seat 24 together with the armature pin. Therefore, the solenoid valve shown in FIG. 1 uses a two-part armature having an armature plate 28, which is decoupled from armature pin 27. In this manner, the overall mass striking the valve seat may be reduced. However, armature plate 28 may subsequently oscillate in a disadvantageous manner. For this reason, an overtravel adjusting disk 70 is provided between armature plate 28 and slide sleeve 34, as shown in FIG. 2. Overtravel adjusting disk 70 limits the sliding path of armature plate 28 on armature pin 27 to dimension d. The post-oscillation of armature plate 28 is reduced by overtravel adjusting disk 70, and armature plate 28 returns faster to its original position at stop 26. Spacer disk 38, slide piece 34, and overtravel adjusting disk 70 are immovably clamped in the housing of the solenoid valve. In the case of conventional solenoid valves, therefore, overtravel distance d has to be adjusted during assembly in the housing of the solenoid valve via the thickness of the overtravel adjusting disk used. Sometimes, however, the thickness of the overtravel adjusting disk may influence the distance of armature plate 28 from electromagnet 29, for example, if the end face of solenoid valve housing 60 is braced against flange 32. In these cases, an inner disk and an outer disk are used in lieu of the overtravel adjusting disk. Thus, the manufacture of the solenoid valve and of the fuel injector provided with the solenoid valve may be costly and complicated. It may not be possible to pre-adjust the overtravel distance or the sliding path d of armature plate 28 on armature pin 27 outside of solenoid valve housing 60.

Figure 3:
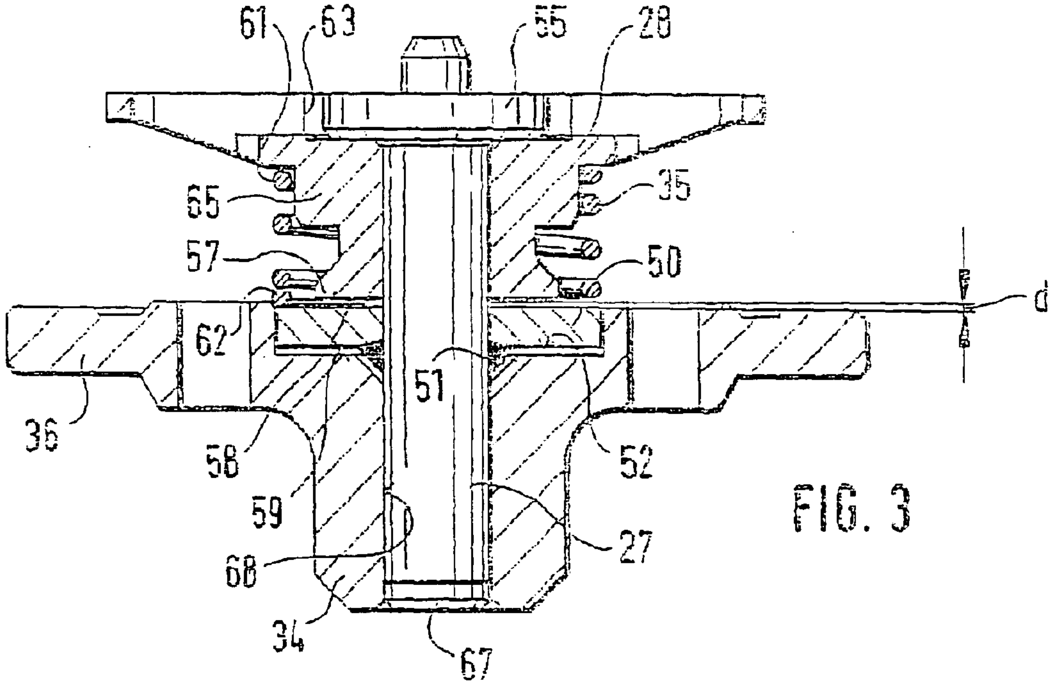
FIG. 3 is a cross-sectional view through a first exemplary armature assembly with slide piece according to the present invention.

FIG. 3 shows a first exemplary solenoid valve according to the present invention, including slide piece 34 and the armature with armature pin 27, armature plate 28 and return spring 35. Identical parts are provided with the same reference symbols. The armature assembly shown in FIG. 3 may, for example, be inserted into solenoid valve housing 60 shown in FIG. 1. However, the present exemplary embodiment differs from the conventional solenoid valve shown in FIG. 2 in that a supporting piece 50, which is firmly connected to armature pin 27, is arranged in place of the overtravel adjusting disk, which is immovably mounted in the housing of the solenoid valve. For example, a disk that is secured to armature pin 27 may be provided as the supporting piece. In the exemplary embodiment according to the present invention shown in FIG. 3, the disk is slid onto armature pin 27 and, subsequently, firmly connected to the armature pin, for example, by welding or adhesive bonding. Other fastening types, such as shrink-fitting, may also be used. In another exemplary embodiment according to the present invention, supporting piece 50 is welded to armature pin 27 on side 59 facing away from the armature plate. As shown in FIG. 1, weld 51 is arranged on lower side 59 of supporting part 50.

Return spring 35 is braced against armature plate 28 with one end 61 and, with its other end 62, against the side 57 of supporting 50 facing armature plate 28.

During the manufacture of the armature assembly, initially, armature plate 28 is slid onto armature pin 27, until the armature plate butts against a head 55 of the armature pin. Head 55 replaces crescent disk 26 shown in FIGS. 1 and 2 and, similar to the crescent disk, is used as a stop for the armature plate. Subsequently, return spring 25 is slid onto guide stub 65 of armature plate 28, until it bears against the armature plate with end 61. Finally, disk-shaped supporting piece 50 is slid onto armature pin 27 a suitable distance, so that required overtravel distance d remains between facing sides 57 and 58 of supporting piece 50 and of guide stub 65. Finally, supporting piece 50 is secured to armature pin 27 in this position. Subsequently, the armature assembly, including armature pin 27, armature plate 28, return spring 35 and supporting piece 50, is inserted into slide piece 34. Armature pin 27 is inserted into a central bore 68 of slide piece 34, which may be clamped with flange 36 in housing 60 of the solenoid valve. Unlike the system shown in FIG. 2, no annular shoulder 33, which limits the opening stroke by butting against slide piece 34, is provided. Instead, the opening travel is limited by armature pin head 55 striking against the electromagnet or a projection of the electromagnet. This permits armature pin 27 shown in FIG. 3 to be inserted into slide piece 34 from above. As shown in FIG. 3, the side of slide piece 34 facing supporting piece 50 has a recess 52, with which the supporting piece engages.

In the installed condition, lower end 67 of armature pin 27 acts upon control valve member 25, which is pressed against valve seat 24 by the closing force of spring 31 when the electromagnet is de-energized. In this position, side 59 of supporting 50 facing away from armature plate 28 as well as weld 51 are spaced apart from the inner wall of recess 52 by a gap. In this manner, supporting piece 50, which is moved with the armature pin, is prevented from butting against the inner wall of recess 52, since such butting could result in control valve member 25 not contacting on valve seat 24. Therefore, recess 52 may also accommodate weld 51 and is may be spaced a bit apart therefrom.

As shown in FIG. 3, a hydraulic damping chamber is formed through the approximation of lower side 59 of supporting piece 50 to the inner wall of cylindrical recess 52 of slide piece 34 during the closure of the solenoid valve. The fuel, which is compressed between supporting piece 50 and recess 52, and which may escape only laterally through the gap, may damp the impact of armature pin 27 and of control valve member 25 coupled thereto on valve seat 24.

When armature pin 27 and valve control member 25 make contact on valve seat 24, armature plate 28 slides downward against the elastic force of return spring 25 because of its inertial mass. Between lower end face 58 of armature plate 28 facing supporting piece 50 and side 57 of supporting piece 50 facing armature plate 28, which supporting piece no longer moves at that moment, a further hydraulic damping chamber forms through the approximation of armature plate 28. The fuel contained in the gap between armature plate 28 and supporting piece 50 produces an opposing force, which counteracts the motion of the armature plate. Thus, the compensating movement of armature plate 28 is limited by the position of the supporting piece on armature pin 27, resulting in a reversal of motion upon previous damping and, consequently, in a reduction of the post-oscillation process.

Figure 4:
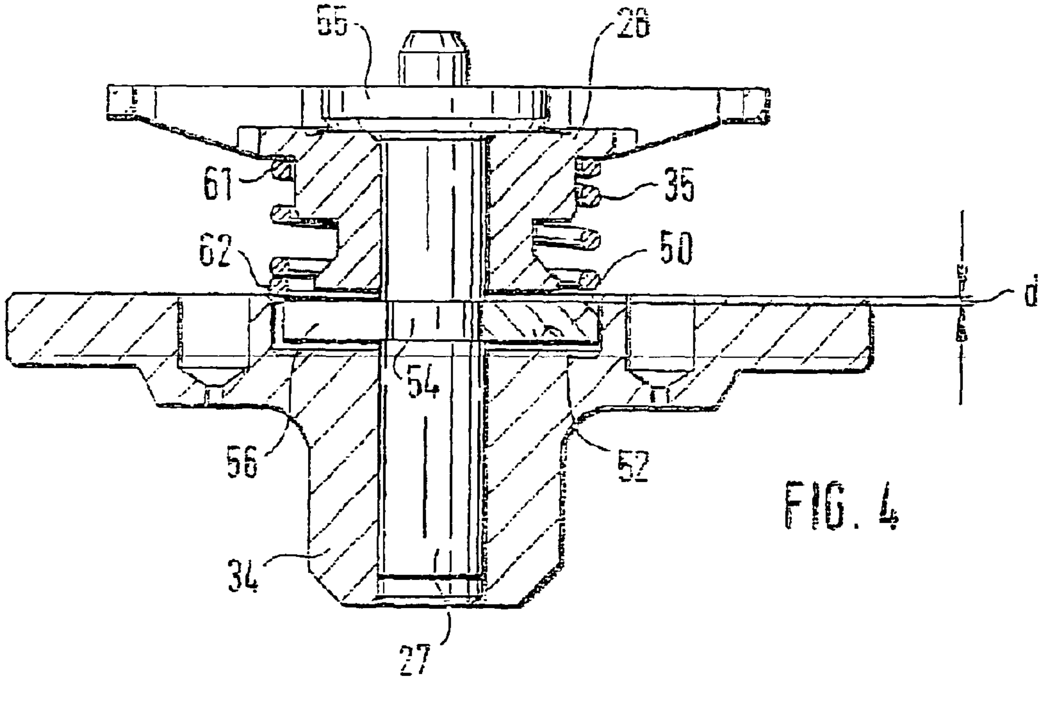
FIG. 4 is a cross-sectional view through a second exemplary armature assembly with slide piece according to the present invention.

FIG. 4 shows another exemplary solenoid valve according to the present invention, which differs from the exemplary embodiment shown in FIG. 3 in that supporting piece 50 is secured to armature pin 27 in a positive-locking manner. In this exemplary embodiment, supporting piece 50 is a crescent disk, which features an open cutout 56 and is laterally slid onto the armature pin with the open end. Armature pin 27 has a circumferential groove 54, with which the inner contour of cutout 56 of crescent disk 50 engages in a positive-locking manner. Crescent disk 50, which is slid onto the armature pin, is secured in its position perpendicularly to the armature pin by recess 52 of slide piece 34. The path length by which the armature pin is moved in axial direction during the opening and the closure of the solenoid valve is smaller than the depth of recess 52, so that crescent disk 50 cannot inadvertently slip out of its position on armature pin 27.

Figure 5:
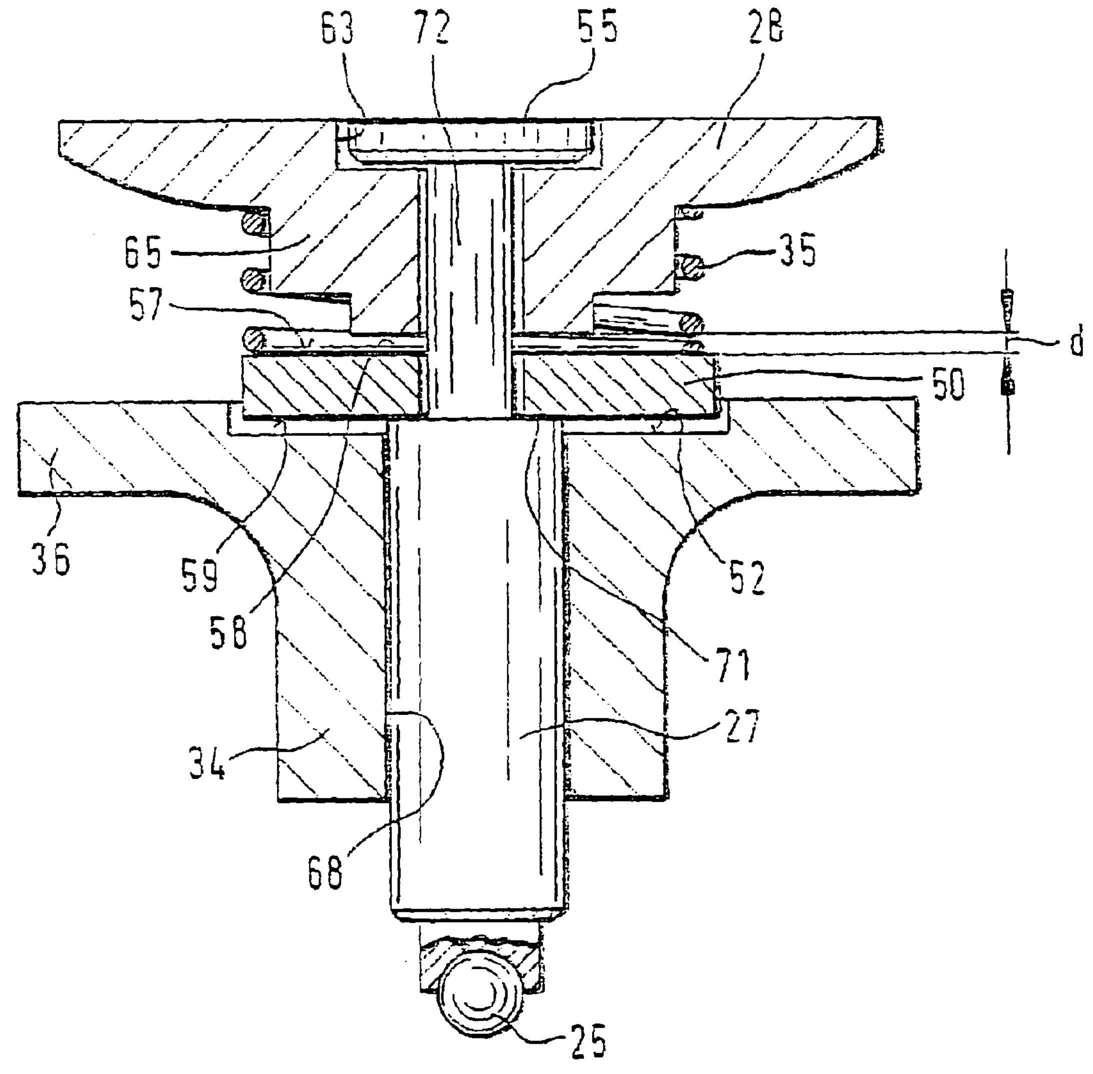
FIG. 5 is a cross-sectional view through a third exemplary armature assembly with slide piece according to the present invention.

FIG. 5 shows a third exemplary solenoid valve according to the present invention. In this exemplary embodiment, supporting piece 50 is a crescent disk, which is slid onto a section 72 of armature pin 27 via the open end (not shown). Section 72 has a smaller diameter than the diameter of the section of armature pin 27, which is guided in slide piece 34 and delimited therefrom by a circumferential shoulder 71. Return spring 35 is braced against armature plate 28 with one end. With the other end, return spring 35 presses crescent disk 50 against circumferential shoulder 71 formed on armature pin 27. The armature assembly may be inserted into slide piece 34 as a preassembled unit, armature pin 27 being inserted into opening 68 and crescent disk 50 at least partially penetrating recess 52. The inner contour of recess 52 secures crescent disk 50 from laterally slipping off of the armature pin.

What is claimed is:

1. A solenoid valve to control a fuel injector of an internal combustion engine, comprising:

an electromagnet;

a movable armature to open and close a fuel discharge passage of a control pressure chamber of the fuel injector, the movable armature including an armature plate, an armature pin, and a control valve member cooperating with a valve seat, the control valve member being operable to move with the armature, the armature plate being supported on the armature pin and being slidably movable in a closing direction of the control valve member via a force produced by an inertial mass of the armature plate;

a return spring having an elastic force and an end facing away from the armature plate, the armature plate being slidably movable against the return spring, the elastic force of the return spring acting upon the armature plate; and a hydraulic damping device to damp a post-oscillation of the armature plate during a dynamic sliding of the armature plate on the armature pin, the hydraulic damping device including a supporting piece mounted on and movable with the armature pin; wherein the end of the return spring facing away from the armature plate is braced against the supporting piece.

2. The solenoid valve according to claim 1, wherein the armature pin, the armature plate, the return spring, and the supporting piece are configured to be inserted into a solenoid valve housing as a preassembled armature assembly.

3. The solenoid valve according to claim 1, further comprising:

a slide piece with an opening immovably mounted in a housing of the solenoid valve, the armature pin being slidably supported in the opening of the slide piece.

4. The solenoid valve according to claim 3, wherein the slide piece includes a side facing the armature plate having a recess with an inner contour, and the supporting piece has an outer contour, the supporting piece being arranged in the recess, the outer contour of the supporting piece being spaced from the inner contour of the recess by a gap.

5. The solenoid valve according to claim 4, wherein the gap is configured to receive a quantity of fuel between the supporting piece and an inner wall of the recess, the gap filled with the quantity of fuel forming a further damping device to damp a striking of the control valve member against the valve seat.

6. The solenoid valve according to claim 1, wherein the supporting piece is disk-shaped.

7. The solenoid valve according to claim 1, wherein the supporting piece is secured to the armature pin by one of a weld, an adhesive bond, a solder joint, and a frictional joint via shrink-fitting.

8. The solenoid valve according to claim 1, wherein the supporting piece is crescent-disk shaped.

9. The solenoid valve according to claim 8, wherein the armature pin includes a circumferential grove, the supporting piece being secured in the circumferential groove in a positive-locking manner.

10. The solenoid valve according to claim 4, wherein the armature pin includes a shoulder and a section that is not guided in the slide piece, the supporting piece being crescent-shaped and mounted to the section of the armature pin in a slidable manner, the elastic force of the return spring urging the supporting piece against the shoulder of the armature pin, the supporting piece being secured in a radial direction by the inner contour of the recess, thereby preventing the supporting piece from slipping off of the armature pin.

* * * * *